INVENTORS.
SHELDON JONES,
OTTO SCHLEIFER,
BY Robert Thompson
ATTORNEY.

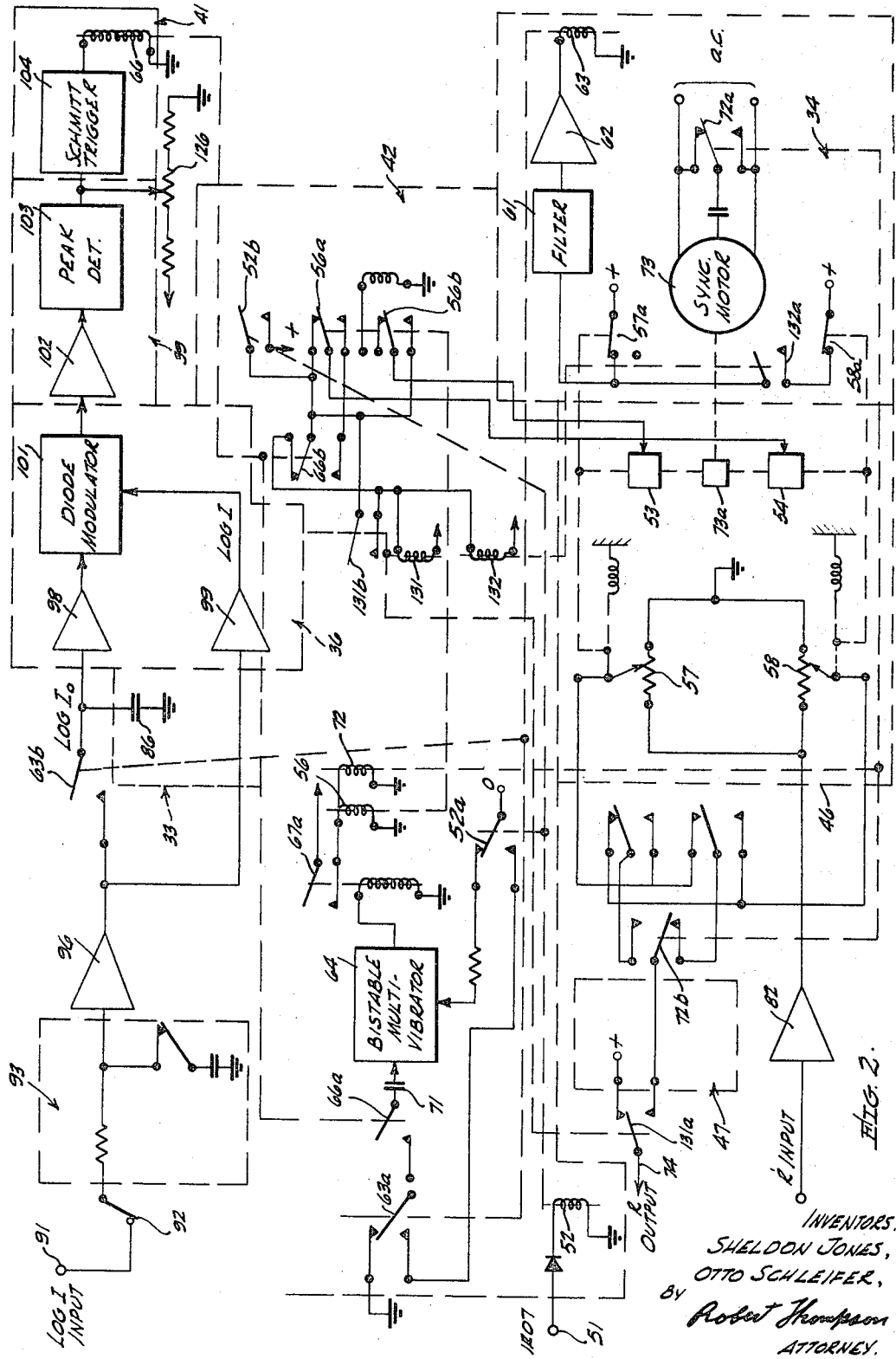

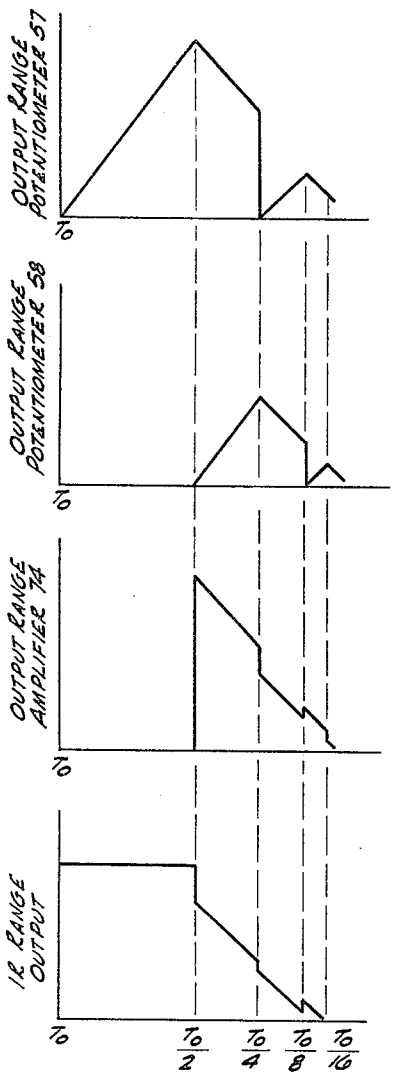
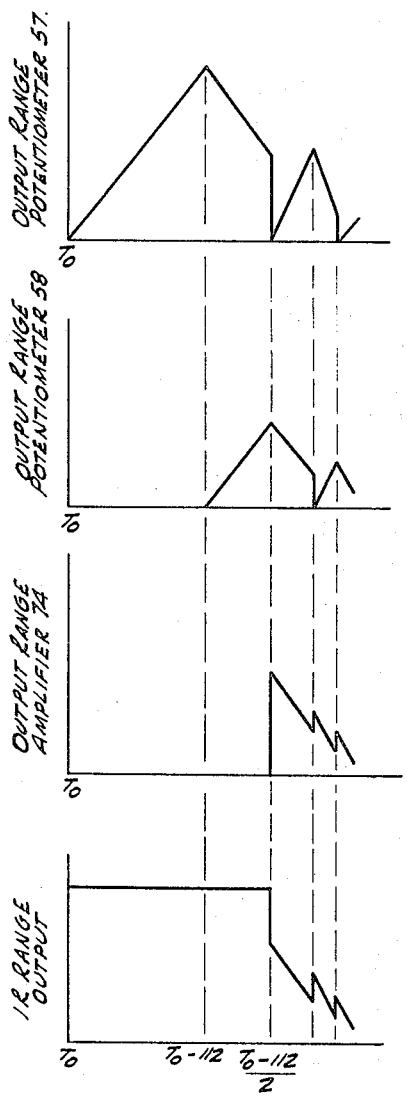

United States Patent Office 3,476,921
Patented Nov. 4, 1969

3,476,921
INFRARED RANGE COMPUTER
Sheldon Jones, Palos Verdes Estates, and Otto Schleifer, Redwood City, Calif., assignors to Hughes Aircraft Company, Culver City, Calif., a corporation of Delaware
Filed Aug. 10, 1964, Ser. No. 388,984
Int. Cl. G01s 9/64; G06g 7/78
U.S. Cl. 235—151.32      11 Claims

ABSTRACT OF THE DISCLOSURE

A range computer which processes changes in level of detected infrared radiation and estimated range rate signal to generate a range signal and which periodically corrects for cumulative errors in the range signal each time detected radiation indicates the distance to target has been halved.

---

This invention relates to a device for determining the range of a relatively movable source of radiant energy and more particularly to a computer for determining the range between a radiation detector and an emissive or reflective source of radiant energy by dtetcting changes in the intensity of sensed radiation resulting from relative movement between the sensor and the source of radiation.

In tracking and locating airborne targets it is necessary to provid information on the elevation, azimuth, and range of the target. Although radar is especially accurate in providing this information, radar can be electronically jammed and, in addition, is not effective at low altiudes because of clutter from the terrain. Infrared radiation detection, however, cannot be jammed because of its passive nature and is not overly sensitive to ground clutter because of its line-of-sight, limited field of view characteristics. A serious limitation of infrared tracking is that target range cannot be determined directly from sensed radiation information since the total energy of the target source radiation and the effects of atmospheric attenuation on the radiation are not known. What is known, however, is that the intensity of the sensed radiation increases as the distance to the source decreases. More specifically, the intensity of the sensed radiation is inversely proportional to the square of the distance to the radiation source; this phenomenon is known as the inverse square law:

$$I = K/R^2$$

where I=intensity, K=constant and R=range.

Accordingly, it is an object of this invention to provide a range computer which determines the range or distance to a moving source of radiant energy by utilizing information derived from the change in the radiation intensity which results from a change in the distance to the target source.

Still another object is to provide a range computer in which the range rate R or relative closing speed between a radiation detector and a source of radiation is utilized to provide a computed range signal representative of the collision distance between the radiation detector and the radiation source.

Another object is to provide a range computer which operationally determines the amount of time required in halving the distance to a source of radiation and then computes the remaining range to the source of radiation based on the assumption that an equal amount of time would be required to travel the remaining half of the distatnce to the target at a relatively constant interpolated range rate.

Yet another object of this invention is to provide a computer of the above type in which the interpolated range rate is periodically compared with the sensed range rate to check for correspondence between the interpolated range rate and sensed range rate.

Still another object of this invention is to provide a range computer of the above type in which the periodic frequency of comparison of the interpolated range rate and the detected range rate increase as the range to the source of radiation decreases.

Yet another object of this invention is to provide a range computer in which range information is derived only when the detected range rate is sufficiently high or when the range is within an upper limit in order to prevent false range signals from being generated.

The aforesaid and other objects and advantages are achieved in a range computer which functions on the premise that approximately a 13 db increase in IR signal strength will occur when a point from the starting point of target tracking is reached which is half the distance to the target. To this end a presently preferred embodiment of this invention provides facilities for comparing the magnitude of said IR signal at the onset of target tracking with the instant IR signal magnitudes occurring as the target is approached during tracking. When approximately a 13 db IR signal magnitude differential occurs between these signals, the time required to reach the target, assuming a constant range rate, equals the time that has elapsed from the onset of target tracking. Range can then be computed in a timing circuit which multiplies range rate by time.

A refinement of this arrangement includes the use of a second timing circuit, the timing cycle of which is initiated at the inception of the 13 db differential in signal magnitudes. At this point an operation similar to the first described timing cycle is repeated for the remaining time to the target. The switching circuits, in addition to initiating operation of the second timing circuit, also insert the new or increased IR signal magnitude, that is, the IR signal which is approximately 12 db above that level which existed when target tracking was first started. The comparison cycle now repeats until a second 12 db differential in signal level occurs. Recycling using the first mentioned and second timing circuits in the cycles described may continue until the desired range information has been developed.

Other objects, features, and advantages of this invention will become apparent upon reading the following detailed description and referring to the accompanying drawings in which:

FIG. 2 is a schematic circuit diagram illustrating in greater detail the range computer shown in FIG. 1;

Figure 1:
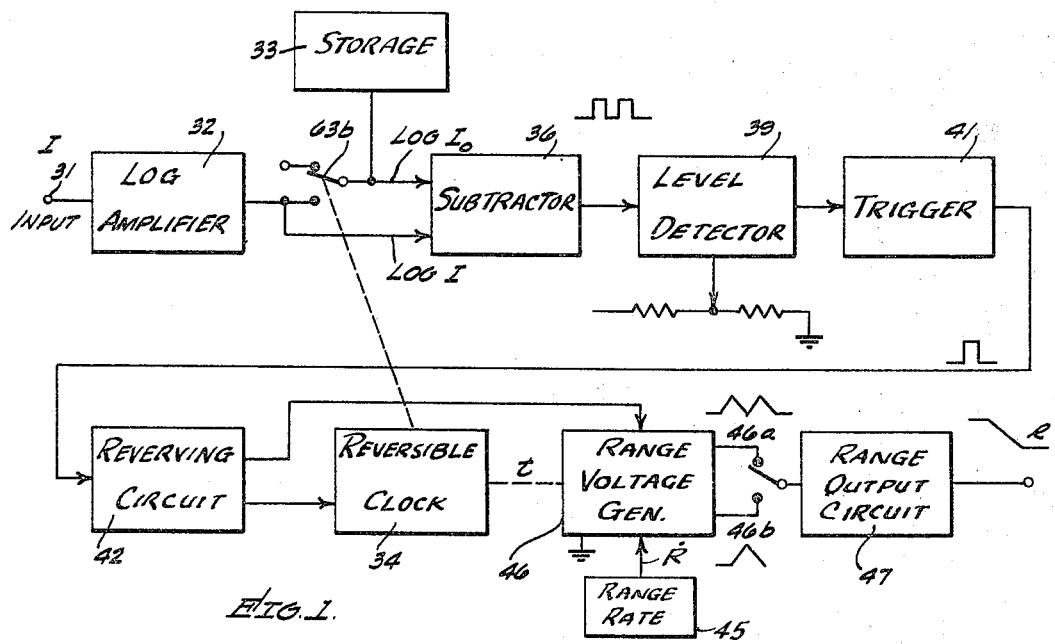
FIG. 1 is a functional block diagram of a range computer provided in accordance with the present invention.
Figure 5:
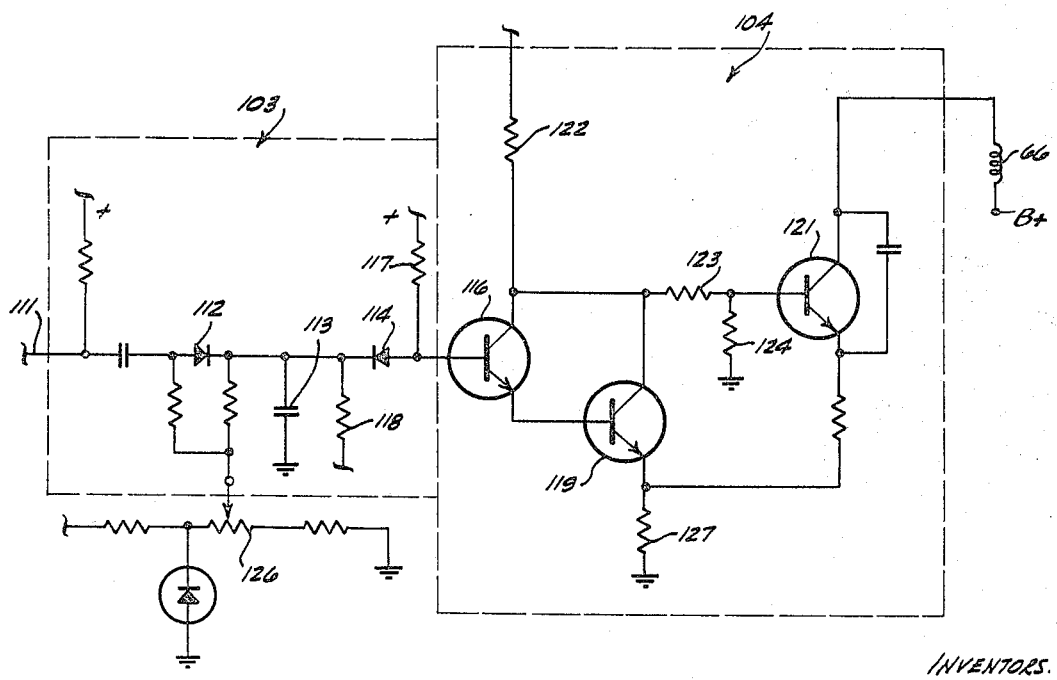

FIG. 4a and FIG. 4b are graphs including curves illustrating waveforms of the range voltage generated by an individual range voltage generator in the computer and the output range voltage derived from combining select segments of the negative slopes of individual range voltages; and FIG. 5 is a circuit diagram of a peak detector and a Schmitt trigger of a comparator portion of the computer circuit.

Before describing the details of the range computer the general operating principles and theoretical derivations will be explained. Basically, the infrared range computer measures the time $t$ for the intensity of sensed infrared radiation received from a target source to increase by an amount (13 db) equivalent to a halving of the range to the source. Then, assuming that it will require the same amount of time $t$ to go the remaining half of the distance to the target, an estimated or interpolated range rate signal $\dot{R}$ is multiplied by the measured time $t$ to obtain a range signal R which is used to position a range mark on an indicator. This procedure is thereafter continued each time the remaining distance is halved.

In order to understand what the relationship is between the measured time interval $t$ and the 13 db increase in radiation intensity, it is necessary to first explain the mathematical derivation involved in the inverse square law ratio:

$$I = \frac{K}{R^2}$$

where I=intensity of radiation, K=a constant, and R=range from target to interceptor. The above ratio indicates radiation intensity varies inversely with the square of range from the target to the interceptor. By taking the ratio of the radiation intensity I at any instant to the radiation intensity, $I_0$ at a reference time $T_0$ the following equation is obtained:

$$\frac{I}{I_0} = \left(\frac{R_0}{R}\right)^2$$

This equation can also be expressed logarithmically as follows:

$$\text{Log} \frac{I}{I_0} = 2 \log \frac{R_0}{R}$$

But a simple measurement of reference intensity $I_0$ is not sufficient to determine range since the total energy emitted by the target is not normally known and, therefore, the initial range $R_0$ is not known. However, if the reference radiation intensity signal (log $I_0$) is stored in a memory device, the difference log $I$−log $I_0$ is equivalent to twice the log of ratio $R_0/R$ or 2 log $R_0/R$. Thus, when the ratio of log $I/I_0$ reaches a certain predetermined value it is known that the range has been halved. Then, if a clock mechanism has been used to measure the time $t$ it takes to halve the initial range $R_0$ and multiplies this measured time $t$ by an estimated or interpolated rate $\dot{R}$, the product is range R to the target:

$$\dot{R}t = R$$

Although the following calculations will show that a 12 db change in signal strength should indicate halving of the range, the use of 13 db is used in an attempt to account for decreased atmospheric attenuation as the range decreases. Calculating further, if the range be halved then:

$$\frac{R_0}{R} = 2$$

$$2 \log 2 = 0.6$$

therefore:

$$\log \frac{I}{I_0} = 0.6$$

The log I signals are sensed as voltages but by definition: decibels=10 times the log power ratio or 20 times the voltage ratio, therefore:

$$20 \log \frac{I}{I_0} = 20(0.6) = 12 \text{ db}$$

Thus, once a nominal 12 db (actually 13 db) change has been sensed, the range to target is known as calculated above. Thereafter, a continued multiplication of range rate $\dot{R}$ by time $t$ allows a continuous calculation of range R to the target.

Before referring to the details of the invention a brief description of the computer operation will be made. An IR intensity signal is received from a source, not shown, and applied to an input terminal of a conventional logarithmic amplifier 32 made in accordance with the disclosure in Vol. 19 of The Radiation Laboratory Series (MIT) pp. 670 to 674. The logarithmic signal is selectively connected for feed to a switched electrical storage means 33. As will be explained later, a storage means 33 is selectively connected to receive the IR log signal only at predetermined time intervals as determined by a reversible clock means 34. At all other times the reference IR intensity signal (log $I_0$) which is stored in the storage means 33 is compared with instantaneous and usually increasing values of the IR intensity signal (log I). For signal comparison, a diode modulator 36 provides a pulse output having an amplitude equal to the difference between the stored signal value log $I_0$ and the instantaneous signal value log I. This modulated pulse output is applied to a level detector circuit 39 which operates a trigger means 41 at such time as the difference between the stored signal log $I_0$ and the instantaneous signal log I is equal to 13 db. Hereafter, such 13 db changes in the log signals will also be referred to as a comparison or comparison level.

Up to the time of the first such comparison, a reversing means 42 has been driving the reversible clock means 34 in a first direction. In addition, an estimated or interpolated range rate signal $\dot{R}$ is provided from an input terminal to the range voltage generator 46 as generated by a range rate signal generator 45 connected thereto. With the occurrence of the first comparison, rotation of the clock means 34 is reversed, thereby driving a range voltage generating means 46 which, in effect, integrates an estimated or interpolated range rate signal $\dot{R}$ provided on an input terminal thereto from the range rate generator 45 to generate a range signal R ramp voltage having a negative slope on one of the two outputs 46a or 46b. Each time another comparison occurs, the clock means 34 is reversed and the other output of the range voltage generating means 46 generates a ramp voltage having a negative slope while the first output is re-referenced to a zero potential, thereby periodically correcting for cumulative error in the range voltage output. A range output circuit 47 is selectively connected to whichever voltage generating output is producing the negative-going ramp voltage, thereby combining segments of the negative ramp voltages to produce a periodically corrected range signal which can be extrapolated to provide range-to-go information.

PRIOR TO IROT

Figure 3:
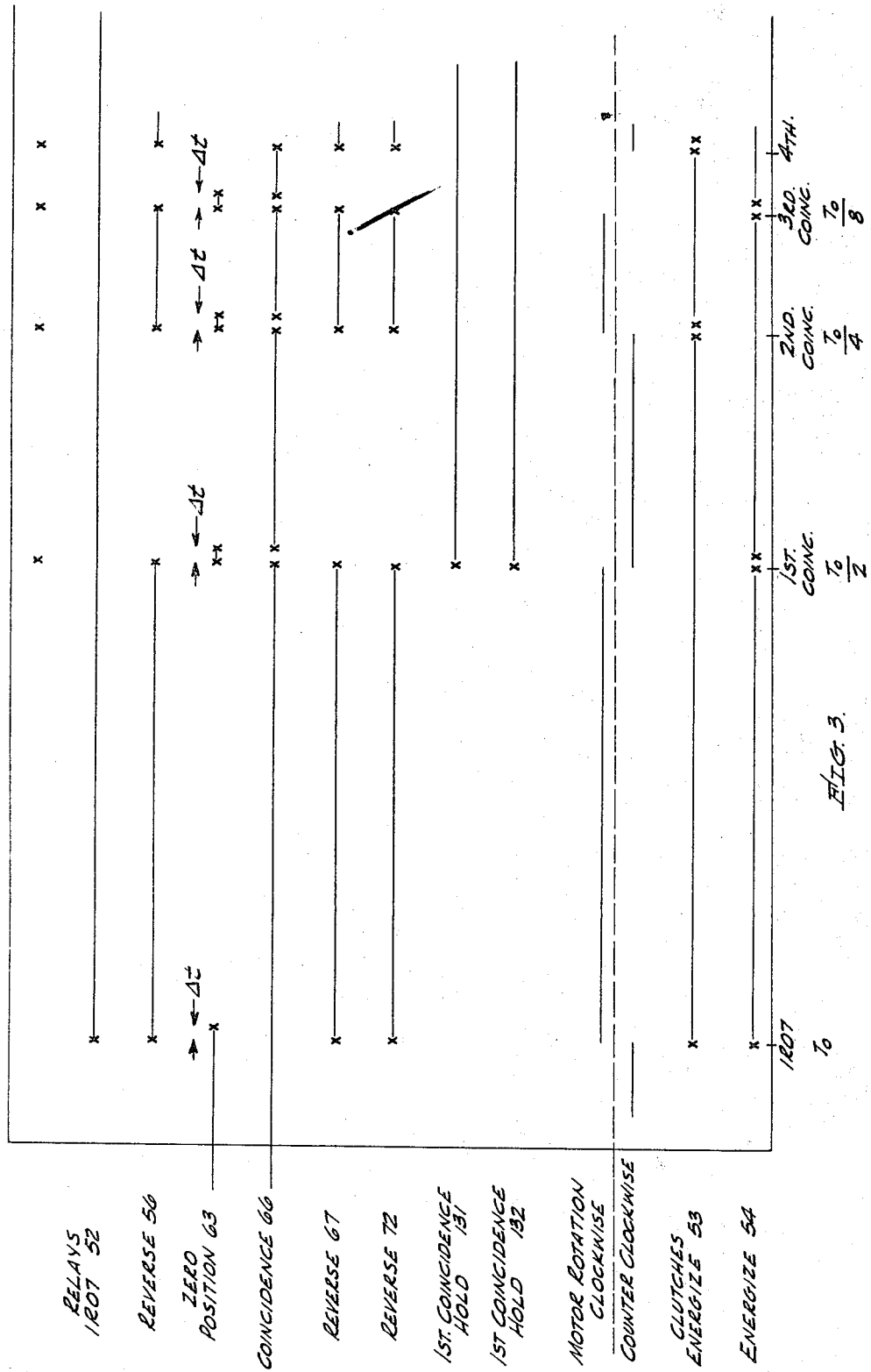
FIG. 3 is a timing diagram of the operation of computer circuit of FIG. 2.

Now referring to the computer circuit illustrated in FIG. 2 and the timing chart of FIG. 3, all relay switches are illustrated in their unenergized or de-energized position. In operation, prior to when an infrared on target signal (hereinafter referred to as IROT) of a predetermined amplitude is received at an on-target input terminal 51, an IROT relay 52 is not energized and an associated multivibrator bias switch 52a and an IROT switch 52b are open. With the IROT switch 52b open, electrical energy cannot be supplied to a pair of conventional magnetic clutches 53 and 54 by way of a clutch selector switch 56a–56b. As a result, neither of a pair of range voltage generating potentiometers 57 and 58, which are spring biased to their zero degree position, can be driven from zero. A conventional magnetic clutch and potentiometer arrangement of this type is illustrated and described in Bulletin P–300 to P–301 of the Technology Instruments Corporation and has model numbers MC–11–31 and MCN–32. With the potentiometer 57 in the zero position a 0°–360° position limit switch 57a is closed, feeding a DC signal through a conventional R-C noise filter 61 having a time constant of 0.24 second and an amplifier 62, of the type illustrated on page 47 of TM 11–690, March 1959 published by the U.S. Government Printing Office, to energize a zero position relay 63. This zero position relay 63 closes an associated multivibrator input switch 63a in series with a multivibrator input switch 66a in the input circuit to a conventional bistable multivibrator 64 of the type illustrated on page 373 of Transistor Circuit Design edited by the Staff of Texas Instruments and published by McGraw-Hill Book Co. A comparison relay 66 which is energized at all times except when comparison occurs closes the associated multivibrator input switch 66a to complete the input control circuit to the collector of bistable multivibrator 64. However, since the IROT relay 52 is not energized, the multivibrator bias switch 52a couples a bias signal to the base of the output transistor (not shown) to drive the output stage of the bistable multivibrator into cutoff. Reverse relay 67 coupled to the output stage is now de-energized. This biased-off state of the multivibrator 64 is maintained as long as the IROT relay 52 is de-energized and the multivibrator bias switch 52a is in the position shown, preventing the application of an input signal to the bistable multivibrator 64 via the closed multivibrator input control switches 63a and 66a.

IROT

When an IROT signal of sufficient magnitude is received at the IROT input 51 the IROT relay 52 is energized to initially reverse the direction of a synchronous clock motor 73 and to energize the magnetic clutches 53 and 54 for selectively driving the range voltage generating potentiometers 57 and 58. More specifically, closure of IROT relay 52 closes the multivibrator bias switch 52a to remove the bias signal from the bistable multivibrator 64 and apply an input signal through the closed multivibrator input switches 63a and 66a and a differentiating capacitor 71 to trigger the multivibrator output into conduction. The reverse relay 67 is then energized to close a reverse switch 67a and energize a parallel pair of reverse control relays 56 and 72.

The contacts 56a and 56b of the reverse relay 56 switch the magnetic slip clutches between direct energization through switch 52b and energization through the lower contacts of switch 66b to determine which magnetic clutch will be momentarily de-energized to permit spring return to zero. Thus, when the reverse control relay 56 is energized, the double pole, double throw clutch control switches 56a–56b operate closing the lower contacts so that the magnetic clutch 53 is energized by a voltage signal coupled through the now closed IROT switch 52b and the lower closed clutch control switch 56b. The other magneic clutch 54 is energized through the now closed lower contacts of switch 66b of a comparison relay 66 and the now closed lower contacts of the clutch control switch 56a.

The other reverse control relay 72 operationally selects which direction the reversible synchronous clock motor 73 will rotate and which one of the potentiometers 57 and 58 is connected to a range output lead 74. In more detail, the reverse relay 72 operates a motor input switch 72a to reverse the motor operation. In addition, when reverse relay 72 is energized, the output select switch 72b is operated to close the upper set of contacts thereof, thereby disconnecting the positive-going potentiometer 57 from the range signal output lead 74 and, as a result, no output signal is generated.

Now referring to the details of the voltage generating potentiometer 57 and 58, an estimated range signal $\dot{R}$ is applied to one terminal of each potentiometer through a conventional cathode follower 82 of the type described on page 429 of Applied Electronics by Gray, 2nd Ed., published by John Wiley and Sons. This estimated or interpolated range rate signal $\dot{R}$ can be generated by a means 45 capable of providing an estimated or interpolated range rate. The movable tap of each potentiometer is spring-biased to the zero or ground terminal of the potentiometer so that no output signal can be generated until the magnetic clutches are energized and the movable taps are driven along the potentiometer by a mechanical linkage connected to the reversible clock motor 73. Since the clock motor 73 is a synchronous motor, it can be assumed that the taps will be driven along the potentiometers at a relatively constant speed. In that the potentiometers are energized by a voltage having an amplitude proportional to the range rate $\dot{R}$, the output of the potentiometers is the product of the range rate $\dot{R}$ multiplied by time $t$ to generate a range signal R:

$$\dot{R}t = R$$

Now referring back to the electrical circuit, both of the magnetic clutches 53 and 54 were initially energized at the time of energization of the IROT relay 52, as previously mentioned. The clock motor 73 can drive the potentiometers 57 and 58 in opposite directions through a conventional gearing 73a such as the type described on page 175 of Engineers Illustrated Thesaurus by H. Herkimer, published by Wm. Penn Publishing Co., New York, N.Y. The potentiometer 57 is driven away from its zero position stop while the potentiometer 58 is driven against its zero stop position causing magnetic clutch 54 to slip. As a result, the first potentiometer 57 generates a ramp voltage having a positive slope while the other potentiometer 58 remains at ground potential and does not generate a time-varying signal.

At a short time $\Delta t$ after the IROT signal has turned on the system and started movement of the tap of the potentiometer 57, the zero position limit switch 57a is opened by movement of the tap linkage from zero position to de-energize the zero position relay 63 which in turn opens the memory input switch 63b in the coincidence circuit portion of the computer. By this time a reference signal log $I_O$ has been stored on memory capacitor 86. In addition, the multivibrator input switch 63a is opened to disconnect the input signal from the bistable multivibrator 64 which continues conducting.

Before describing how the synchronous clock motor is reversed at each comparison, the level detecting portion of the computer circuit and its operation on the IR signal input will be described. An IR intensity log signal (log I) is continuously applied to the input terminal 91 from a conventional IR detector means (not shown) and periodically applied to a memory capacitor 86, by way of a normally closed switch 92, an RC noise filter 93 having a time constant of 3 seconds, an isolating emitter follower 96 of the type previously described, and the memory input switch 63b, whenever the zero position relay 63 is energized. At any time that the potentiometer 57 is removed from its zero positions, the associated zero position switch 57a is opened to selectively de-energize the zero position relay 63 thereby opening the associated memory input switch 63b and disconnecting the memory capacitor 86 from the input. Thus, the IR intensity signal (log $I_O$) at the time of disconnect (which is time zero ($T_O$) in the tracking mode) is stored on the memory capacitor 86.

The stored IR intensity signal (log $I_O$) is thereafter continuously compared with the instantaneous value of the IR intensity log signal (log I) by a conventional diode modulator 101, which produces a pulse output having an amplitude equal to the difference between the stored signal (log $I_O$) and the instantaneous signal (log I) applied to input terminal 91. A diode modulator of this type is described in vol. 19, Radiation Laboratory Series (MIT) page 394 and described in pages 397–400. For comparison of the signal amplitudes, each of these IR intensity log signals are simultaneously fed to the diode modulator 101 through respective ones of the parallel pair of cathode follower circuits 98 and 99. The pulse output from diode modulator 101 is amplified to a usable 400 c.p.s. level by a conventional AC amplifier 102 of the type described in the previously referenced Transistor Circuit Design, page 247, FIG. 18.9, and then applied to a peak detector 103 which is adjusted to produce a triggering signal for Schmitt trigger 104, to be described, when the difference between the stored radiation intensity signal (log $I_O$) and the instantaneous radiation intensity signal (log I) exceeds 13 db. This 13 db. signal increase is referred to as a comparison level or time of comparison. When the Schmitt trigger receives the signal from the peak detector, the normally on comparison relay 66 is cut off to set up the initial circuit conditions during each comparison time interval.

Referring now to the details of the peak detector 103 and modified Schmitt trigger 104 (FIG. 5), the amplified modulated pulse signal is peak detected by a half-wave rectifier circuit including a diode 112 which reuslts in a charge being stored across a capacitor 113. The voltage signal developed across the charged capacitor 113 thus becomes more positive with respect to ground as the magnitude of the modulated IR log signal strength increases. Ths positive signal is coupled through a coupling diode 114 to the base of an input transistor 116 in the Schmitt trigger 104. This coupling diode 114 is forward biased by means of a pair of resistors 117 and 118 connected respectively to the positive and negative terminals of a voltage source (not shown) so as to apply the voltage developed across the capacitor 113 between ground and the emitter of a transistor 116 thereby compensating for base-to-emitter voltage changes occurring in the Schmitt trigger transistors 116 and 119.

In operation, the Schmitt trigger output stage transistor 121 is normally biased in the conducting state by the voltage divider action of resistors 122, 123 and 124 connected between a relatively positive potential terminal and a ground potential terminal of a voltage source. The other two Schmitt trigger transistors 116 and 119 are biased to cutoff by the voltage developed across resistor 127 by the emitter current of the normally conducting output transistor 121. In order to trigger the Schmitt circuit 104 when a 13 db change in the IR log strength signal is received at the base of the input transistor 116, the threshold level of the transistors 116 and 119 is set by the comparison level adjust resistor 126 connected to the peak detector circuit. When a 13 db change in IR log signal occurs, the two transistors 116 and 119 conduct and output transistor 121 is driven to cutoff by the voltage developed across resistor 127. As a result, the comparison relay 66 is de-energized to set up the circuit conditions for the first coincidence time interval as described above.

FIRST COMPARISON

Based on the assumptions that the range ratio, $\dot{R}$, is constant, and that the first comparison occurs when the range of the target has been halved, the computer circuit then operates on the further assumption that it will take an equal amount of time to travel the remaining half of the distance to the target. As previously mentioned, a voltage proportional to the range rate $\dot{R}$ is applied to the potentiometers 57 and 58. If then, the positive-going potentiometer is now reversed by the constant speed motor 73 and run down starting at the time of comparison, an extrapolation of the negative slope of the ramp voltage generated during this rundown would ideally give an indication of the range-to-go. This assumption, however, is based on a further assumption that the range rate will remain relatively constant. In actuality, however, the range rate may vary due to changes and relative speed of the target or changes in the angle of attack or aspect angle during intercept. An important feature of this invention is that computation errors resulting from such variations in the assumed environmental parameters are noncumulative in effect.

With the occurrence of the first comparison (13 db increase) the trigger relay 66 is de-energized to open the multivibrator input switch 66a and to open the clutch control switch 66b, thereby de-energizing and disengaging the magnetic slip clutch 54 connected in the mechanical linkage from clock motor 73 to potentiometer 58. This disengaging operation assures that the potentiometer 58 is spring biased to the zero reference level.

With the coincidence switch 66b open, as shown, a voltage signal is applied to a pair of first comparison hold relays 131 and 132. An associated output switch 131a is now operated to close its lower contacts to connect the range output lead 74 for range information feed to a display such as a conventional "C" scope (not shown); and from any time after the first comparison, both of the first compraison hold relays 131 and 132 are retained in the energized state by the holding circuit completed by hold switch 131b until such time as the IROT signal is removed from input terminal 51 and the IROT relay 52 de-energized.

Since the zero position limit switch 58a is closed as a result of the potentiometer 58 being in the zero position, closure of the first comparison switch 132a closes the limit switch circuit to apply a signal to energize the zero position relay 63. Energization of the zero position relay 63 closes the associated multivibrator input switch 63a and memory input switch 63b.

Closure of the memory input switch 63b permits the memory capacitor 86 to be recharged to a level equal to the IR signal intensity log at the first comparison or halfway point. During this storage time the output voltage of cathode follower circuit 98 is equal to the output voltage of the cathode follower circuit 99 and as a result there is no output signal from the diode modulator 101. In addition, such closure of the memory switch 63b allows sufficient time to elapse for the peak detector capacitor 113 to discharge, thereby returning the Schmitt trigger 104 to the normally on output state whereupon the comparison relay 66 is energized.

Energization of the comparison relay 66 closes the associated multivibrator input switch 66a allowing a pulse signal to be applied to the input of the bi-stable multivibrator 64. As a result, the bistable multivibrator changes state and the output signal is cut off causing reverse relay 67 to be de-energized thereby opening reverse control switch 67a and in turn deenergizing the reverse switches 56 and 72. Deenergization of the reverse switch 56 closes the upper contacts of each switch 56a and 56b coupling magnetic clutch 54 to the positive source through contacts 52a and coupling magnetic clutch 53 to contacts 66b and thence through switch 52a to the positive source. Both clutches are again energized. (See FIG. 3).

Up until the time of first comparison, the synchronous clock motor 73 had been turning in a first direction. With de-energization of the reverse relay 72, however, the motor input switch 72a is switched to reverse the direction of the rotation of the synchronous motor 73. This reversal of the synchronous clock motor 73 causes the potentiometer 57 to stop moving away from its zero position and to reverse its direction of movement, thereby initiating the generation of a ramp voltage waveform having a negative slope. With the magnetic clutch 54 energized and the motor reversed, the potentiometer 58 is now driven away from its zero position stop to generate a ramp voltage having a positive slope. Since the reverse relay 72 is now de-energized the associated potentiometer selector switch 72b is opened to connect the negative-going range potentiometer 57 to the output lead 74. As a result, only the ramp voltage having the negative going slope is applied to the output.

At a short time interval $\Delta t$ after first comparison, movement of the potentiometer 58 away from its zero position causes the mechanical linkage to open the associated zero position limit switch 58a to remove the energization signal from the zero position relay 63. The multivibrator input switch 63a and the memory capacitor input switch 63b are opened by de-energization of the zero position relay to prevent further charging of the memory capacitor 86. Thereafter, the synchronous clock motor 73 continues turning while the potentiometer 57 generates a negative slope ramp voltage and the lower potentiometer 58 generates a positive slope ramp voltage. When there is a 13 db increase in the instantaneous IR log signal log I over the IR log signal log $I_0$ stored at the time of first comparison, the comparison circuit position of the computer again operates the modified Schmitt trigger 104 to de-energize comparison relay 66 and set up the circuit conditions for the second comparison time interval.

SECOND COMPARISON

If at the instant of second comparison, the range rate information signal R applied to the potentiometers had been accurate and had not changed, the amplitude of the negative slope ramp voltage from the potentiometer 57 would be equal to the amplitude of the positive slope ramp voltage from the potentiometer 58. If, however, the range rate information signal was not accurate or changes in the parameters did exist, then there would be a discontinuity or difference between the voltage levels generated by the two ramp voltage generators or potentiometers 57 and 58. This condition is indicated by the discontinuity in the output voltage waveform graphically illustrated in FIG. 4a.

At this time of second comparison (13 db change) there is again an assumption that the interceptor has gone one-half of the remaining distance or three-quarters of the total original distance to the target. At the second comparison the synchronous clock motor 73 will again be reversed to be driven in the initial direction. When the lower contacts of switch 66b open the potentiometer 57 will be declutched by the magnetic clutch 53 for spring return to a zero reference potential level, while the potentiometer 58 will be reversed and will now generate a negative going output voltage which will be applied to the range output lead 74.

More specifically, at the second comparison, the comparison relay 66 is de-energized to open the bistable multivibrator input switch 66 and input circuit to the bistable multivibrator 64. In addition, the comparison control switch 66b is opened to de-energize and disengage the magnetic clutch 53 through clutch control switch 56b. When the magnetic clutch 53 disengages, the range potentiometer 57 spring returns to its zero degree position stop and the associated linkage closes the zero position limit switch 57a to close the circuit for supplying an energizing signal to the zero position relay 63. This energization of the zero position relay 66 closes the multivibrator input switch 63a and the memory input switch 63b, thereby allowing the memory capacitor 86 to be charged to the value of the IR voltage signal at the time of second comparison. The outputs of the cathode follower 98 and the cathode follower 99 are, at this time, equal and no modulated pulse signal is produced by the modulator 101. During this storage time the peak detector capacitor 113 is again allowed to discharge driving the Schmitt trigger 104 into the energized output state thereby energizing the comparison relay 66.

Energization of the comparison relay 66 closes the multivibrator input switch 66a to apply a pulse signal to change the state of the bistable multivibrator 64 causing the output stage to conduct, thereby energizing the reverse relay 67. The energized reverse relay 67 closes reverse switch 67a to apply an energizing signal to reverse switches 56 and 72. As a result, the associated motor input switch 72a is closed to reverse the direction of clock motor rotation so that the synchronous motor 73 again rotates in the first direction. This time, however, the range potentiometer 58 is displaced from its zero stop and is now being driven back toward the zero stop to generate a range signal having a negative slope at the same time potentiometer 53 is again being driven from its zero position. The potentiometer selector switch 72b is also closed by energization of the reverse relay 72 so that the negative-going ramp voltage generated by potentiometer 58 is now coupled to the output lead 74 so as to generate a continuation of the negative-going output voltage from range lead 74.

As graphically illustrated by the voltage waveform of FIG. 4a, a slight discontinuity exists at the time of switching from the potentiometer 57 to the potentniometer 58 at the time $T_o/4$ if the estimated or interpolated range rate $\dot{R}$ does not actually correspond to the detected range rate. Ideally, however, there would be no discontinuity between the two voltage waveforms and they would combine as a smooth continuous slope. With the potentiometer 57 spring returned to zero, zero position limit switch 57a is closed to close the circuit for applying a signal to zero position relay 63. As a result of momentary energization of zero position relay 63, the multivibrator 64 has energized relays 67, 56 and 72. The magnetic clutch control switch 66b since the lower contacts of switches 56a and 56b are closed so that both clutches are now energized. At this time the potentiometer 57 begins to generate a positive-going ramp voltage while potentiometer 58 begins to generate the negative-going ramp voltage which is a continuation of the negative-going ramp voltage previously generated by the potentiometer 57 during the first coincidence time interval.

At a slight time interval $\Delta t$ after the start of the second comparison time interval, as the potentiometer 57 is driven from the zero position, the mechanical linkage opens the zero position switch 57a to de-energize the zero position relay 63. As a result, the multivibrator input switch 63a is opened to remove the input signal from the bistable multivibrator 64 and the memory switch 63b is opened to disconnect the log I signal from the storage device and stop the charging of the memory capacitor 86. Thereafter, the range potentiometer 58 continues generating a negative-going ramp voltage waveform which is fed to the range lead 74 until a third comparison occurs.

THIRD COMPARISON

At this time of third comparison the distance to the source of radiation has decreased to one-half of the remaining distance or ⅞ of the total distance to the target. At this time, the comparison relay 66 is again de-energized in the manner previously described to set up the circuit conditions for the third comparison time interval.

If the third comparison time interval is initiated before an operator decides that sufficient range information has been obtained, the synchronous clock motor 73 is again reversed and the signal generation and sequence of relay operation are the same as during the first comparison time interval (see FIG. 3) except that the first comparison hold relays 131 and 132 have already been locked in the energized state by the hold switch 131b. At comparison, the comparison relay 66 is de-energized to open the comparison switch 66b and disengage the magnetic clutch 54. With the magnetic clutch 54 disengaged, the potentiometer 58 is spring returned to its zero stop and the associated zero position limit switch 58a is closed. Closure of the zero position switch 58a completes the circuit to apply a voltage signal to energize the zero position relay 63 whereafter the sequence of events are the same as occurred during the first comparison time interval. Thus, the second potentiometer 58 is referenced to the zero potential level to compensate for cumulative error in the computed range information.

Another feature of this invention is that a range voltage signal will not be generated if the range rate of closing speed is too slow or if the range is too great. The generated waveforms for these conditions being illustrated in the first portion of the waveform of FIG. 4b. Say, for instance, that 112 seconds have elapsed after IROT energization of relay 52 without the occurence of a 13 db, increase in the IR log signal. At this time the synchronous clock motor 73 will have rotated the potentiometer 57 a full 360°, whereupon the associated zero position limit switch 57a is mechanically closed. A voltage signal is thus conducted to energize the zero position relay 63, thereby closing the multivibrator input switch 63a and the memory switch 63b so as to change the state of the bistable multivibrator 64 and to connect the memory capacitor 86 to the log I signal input for charging to a new value. When the bistable multivibrator 64 changes states the output is cut off and the reverse relay 67 is de-energized, opening the reverse switch 67a, thereby de-energizing the reverse relays 56 and 72. De-energization of the reverse relay 72 opens the motor input switch 72a to cause a reversal in the direction of rotation of the synchronous clock motor 73, thereby reversing the direction of movement of the range potentiometer 57 and causing the potentiometer to generate a negative-going ramp voltage as illustrated graphically in FIG. 4b. At this same time, the range potentiometer 58 is driven away from zero to generate a positive-going ramp voltage. Since no comparison has occurred, the comparison relay 66 remains energized, thereby holding the comparison switch 66b closed and maintaining the comparison hold relays 131 and 132 in the de-energized state. Should the first comparison interval occur during the 112-second period of potentiometer rundown, the comparison relay 66 will be de-energized, in the manner previously described, to set up the first comparison circuit conditions and the first range information will be taken from the negative-going range potentiometer 57 to generate an output waveform as illustrated graphically in FIG. 4b. At the time of second comparison, the potentiometer 58 will reverse directions and generate a segment of the negative slope ramp voltage and so on.

The slopes of the graphically illustrated ramp voltages in FIG. 4a and 4b are also compared to better illustrate how changes in environmental parameters affect the output range signal. With reference to the environmental parameter conditions of FIG. 4a, the range rate and the aspect angle are fairly constant with slight discontinuities in the waveform slope occurring as a result of natural variations in the parameters. For the conditions illustrated in FIG. 4b, however, the waveform slope does vary from time to time and is indicative of varying range rate or varying aspect angle parameters. In comparing the end result information from both of these graphically illustrated output signals, it can be seen that extrapolation of either computed range signal will produce range information which is sufficiently accurate for a weapons system control such as release of missiles. As a result, it is only necessary to apply an estimated or interpolated range rate signal R̂ to the potentiometers 57 and 58.

It should be understood, of course, that the foregoing disclosure relates to only a preferred embodiment of the invention and that modifications or alterations may be made therein without departing from the spirit and the scope of the invention.

What is claimed is:

1. In a radiation detector system of the type including a detector for sensing variations in radiation intensity received from a radiation source moving relative to the detector and converting the detected radiation information to a signal, and means for providing an estimated range rate signal about proportional to the relative movement between the detector and radiation source a range computer comprising:

storage means connected to periodically sample and store the detected radiation information signal; signal comparing means connected to compare the difference between an instantaneous value of the detected radiaiton information signal and the stored information signal from said storage means for producing a reversing control signal when the difference between the signals exceeds a predetermined level resulting from a halving of the initial range; reversible means connected to be operated at a constant speed in a first direction to generate a first time signal and connected to be reversed by said reversing control signal for operation in an opposite direction to generate a second time signal; range signal generating means connected to combine the time signals from said reversible means and the range rate signal for generating a continuous range signal having a magnitude directly proportional to range to the target source from the time of halving the range to the source of radiation; and bias means connected to return said range signal generating means to a reference level at each change in direction of said reversible means whereby cumulative errors in range signal are compensated for.

2. In a radiation detector system of the type including a detector for sensing variations in radiation intensity resulting from movement of a radiation source relative to the detector and converting the detected radiation information to an electrical signal, and means for providing an estimated range rate signal about proportional to the relative movement between the detector and radiation source a range computer comprising:

electrical storage means connected for periodically sampling and storing the radiation information signal; signal comparing means connected to compare an instantaneous value of the radiation information signal with the value of the stored electrical signal on said storage means for producing a reversing signal when the difference between compared electrical signals exceeds a predetermined ratio proportional to a radiation signal intensity increase resulting from a halving of the radiation range; reversible clock means connected to be driven at a constant speed and connected to be actuated by the reversing signal from said signal comparing means for operation in opposite directions to generate time signals equal to the time required to travel half the distance to the radiation source; range signal generator means connected to combine the time signal from said clock means and the range rate signal to generate a range signal having a constant directional movement toward a zero range reference level to provide an indication of range between the detector and the radiation source; and bias means connected to return said range generator means to a reference level at each reversal in clock direction whereby cumulative errors in the range signal are compensated for.

3. A computer for determining the range of a radiation source from a detected infrared radiation intensity signal having a level related to the distance to the source of radiation and from a range rate signal about proportional to the relative range rate of the source of radiation comprising:

means connected to receive the radiation intensity signal for generating a reversing control signal each time the level of the sensed radiation signal increases by an amount equivalent to an radiation level increase resulting from halving the distance to the source; reversible clock means connected to be driven at a constant speed and connected to be driven in a reverse direction by the reversing control signal to generate time signals equal to the time to go to collison with the radiation source; and range signal generating means connected to receive and combine the time signal from said reversible clock means and the range rate signal generating a range signal having an amplitude proportional to range to go to the radiation source.

4. A computer for determining the range of a radiation source which is moving relative to a detector from a detected infrared radiation intensity signal having an amplitude related to the distance to the source of radiation and from a range rate signal about proportional to the relative range rate of the source of radiation comprising:

means connected to receive the detected infrared intensity signal for generating a reversing control signal each time the intensity of the sensed radiation increases by an amount equivalent to an intensity increase resulting from halving the distance to the source; reversible clock means connected to be driven at a constant speed in a first or second direction and connected to be driven in a reverse direction by the reversing control signal to generate a time signal equal to the time to go to collision with the radiation source; and a range signal generating means including a first and a second linear voltage generator each connected to receive the range rate signal and connected to be selectively driven by said reversible clock means to generate individual range signals, and a first and a second clutch means connected to said first and second voltage generator respectively to alternately drive one of said voltage generating means in a decreasing voltage direction and to momentarily release the other said voltage generator for bias to a reference level and then to reconnect the biased voltage generator to be driven in an increasing voltage direction whereby the decreasing voltage generated signal gives an extrapolated computation of the distance to the source of radiation.

5. A computer for determining the range of a radiation source which is moving relative to a detector from a detected radiation intensity signal having an amplitude related to the distance to the source of radiation and from a range rate signal about proportional to the relative range rate of the source of radiation comprising:

means connected to receive the detected radiation intensity signal for generating a reversing control signal each time the intensity of the sensed radiation increases by an amount equivalent to an intensity increase resulting from halving the distance to the source; reversible clock means connected to be driven at a constant speed in a first or second direction and connected to be driven in a reverse direction by the reversing control signal to generate a time signal equal to the time to go to collision with the radiation source; and range signal generating means including a first and a second linear voltage generator, said first and said second voltage generators including a first and a second potentiometer respectively, each connected to receive the range rate signal; first and second clutch means connected to said first and second potentiometers respectively to releasably connect driving motion to said potentiometers, said reversible clock means being connected to said first and second clutch means to selectively drive said first and second potentiometers respectively, and first and second spring means connected to return said first and second potentiometers to a zero reference potential when the respective clutch is released; and switch means connected to selectively energize said first and second clutch means to selectively drive one of said voltage generating means in a decreasing voltage direction and to momentarily release the other said potentiometer for spring bias to the zero reference level and to reconnect the said biased voltage generator for drive in an increasing voltage direction at each reversing control signal, whereby the decreasing voltage signal gives an extrapolated computation of the distance to the source of radiation.

6. A range computer for measuring the distance to a source of radiation moving relative to a detector from a detected radiation intensity signal having an amplitude related to the distance to the source of radiation and a range rate signal about proportional to the relative range rate of the source of radiation comprising:

a means connected to convert the detected radiation intensity signal to a logarithmic electrical signal; electrical storage means connected to selectively sample the logarithmic signal at predetermined comparison time intervals; a level detector means connected to simultaneously compare the stored logarithmic signal with the instantaneous logarithmic signal received from said radiation detector and to generate a comparison signal at each 13 db increase in the instantaneous signal over the stored signal; reversible clock means connected to be operated at a constant speed in a first or a second direction; a bistable multivibrator means connected to receive the comparison signal and to thereby change states, the output of said multivibrator being connected to reverse the direction of said reversible clock means; and a range signal generator connected to said reversible clock means and to receive the range rate signal for generating a range signal waveform having a negative slope wherein the extrapolated value of a negative slope of the range signal is approximately equal to the collision time to the source of radiation and the instantaneous amplitude, relative to a zero reference level, of the negative portion of the range signal is directly proportional to the range of the target source.

7. A range computer for measuring the distance to a source of radiant energy moving relative to a detector from a detected radiation intensity signal having an amplitude related to the distance to the source of radiation and a range rate signal about proportional to the relative range rate of the source of radiation comprising:

means connected to receive the detected radiation intensity signal for generating reverse signal each time the level of sensed radiation signal varies by a factor corresponding to a decrease in the distance to the target source by one-half; reversible clock means connected to be driven in a first or a second direction by the reverse signal; range signal means connected to combine the range rate signal and the signal from said reversible clock means to generate a range signal directly proportional to the distance to the target source; and means for referencing the generated range signal each time the detected range is halved whereby a nonlinear discontinuity is generated in the range signal when variations exist between the detected range and the range rate signal.

8. A range computer for measuring the distance to a source of radiant energy moving relative to a detector from a detected radiation intensity signal having an amplitude related to the distance to the source of radiation and a range rate signal about proportional to the relative range rate of the source of radiation, comprising:

a radiation level detector connected to energize the range computer only when the level of detected radiation intensity signal exceeds a predetermined intensity; means connected to receive the detected radiation intensity signal for generating a reverse signal each time the level of sensed radiation signal varies by a factor corresponding to a decrease in the distance to the target source by one-half; reversible clock means connected to be driven in a first or a second direction by the reverse signal; range signal means connected to combine the range rate signal and the signal from said reversible clock means to generate a range signal directly proportional to the distance to the target source; and means for referencing the generated range signal each time the detected range is halved whereby a nonlinear discontinuity is generated in the range signal when variations exist betwen the detected range and the range rate signal.

9. A range computer for measuring the distance to a source of radiant energy moving relative to a detector from a detected radiation intensity signal having an amplitude related to the distance and a range rate signal about proportional to the relative range rate of the source of radiation, comprising:

means connected to receive the detected radiation intensity signal, said means including an electrical storage means connected to store the detected radiation intensity signal at a predetermined time, and to generate reverse signals each time the strength of the sense radiation signals varies from the stored radiation signal by a factor corresponding to a decrease in the distance to the target source by one-half; reversible clock means connected to be driven in a first or a second direction by the reversing signal, said clock means having an upper time limit sufficient to reverse the clock motor operation without producing an output range signal at such times as detected range rate is below a predetermined value or the target range is above a predetermined value; range signal means connected to combine the signal from said range rate signal and the signal from said reversible clock means to generate a range signal directly proportional to the distance to the target source; and means for referencing the generated range signal at each time reversing signal whereby a nonlinear discontinuity is generated in the range signal when variations exist between the deteited range and the range rate signal.

10. A range computer for measuring the distance to a source of radiation moving relative to a detector from a detected radiation intensity signal having an amplitude related to the distance to the source of radiation and a range rate signal about proportional to the relative range rate of the source of radiation comprising:

a means connected to convert the detected radiation intensity signal to a logarithmic electrical signal; electrical storage means connected to selectively sample the logarithmic signal at select comparison time intervals; detector means connected to simultaneously compare the stored logarithmic signal with the instantaneous logarithmic signal received from the radiation detector to generate a comparison signal at each 13 db increase in the instantaneous signal over the stored signal; reversible clock means connected to be operated at a constant speed and to be driven in an opposite direction by each of the comparison signals to generate a time signal having a period equal to the time to go to collision with the target source; and a range signal generator connected to said reversible clock means and to receive the range rate signal for generating a range signal having a negative slope wherein the extrapolated value of a negative slope of the range signal is approximately equal to the collision time to the target and the instantaneous amplitude, relative to a zero reference level, of the negative portion of the range signal is directly proportional to the range of the target source.

11. A range computer for measuring the distance to a source of radiation moving relative to a detector from a detected radiation level signal having an amplitude related to the distance to the source of radiation and a range rate signal about proportional to the relative range rate of the source of radiation, comprising:

means connected to convert the detected radiation intensity signal to a logarithmic electrical signal; electrical storage means connected to selectively sample the logarithmic signal at predetermined coincidence time intervals; detector means connected to simultaneously compare the stored logarithmic signal with the instantaneous logarithmic signal received from the radiation detector to generate a comparison signal at each 13 db increase in the instantaneous signal over the stored signal; reversible clock means connected to be operated at a constant speed in a first or second direction and to reverse directions at each comparison signal to generate a time signal having a period equal to the time to go to collision with the target source; a range signal generator means including a first and a second linear voltage generating means connected to receive the range rate signal and each selectively connected to be driven by said reversible clock means to generate two independent triangular waveforms displaced 90° out of phase with one another; bias means connected to urge said voltage generating means to a zero reference level; a coupling means connected to disconnect one of said linear storage generators for bias return to zero reference level each time said clock is reversed; and an output switch means connected to receive only the negative slope portion of the triangular waveform wherein an extrapolated value of the negative slope provides a range signal approximately equal to the collision time to the source of radiation and wherein the instantaneous amplitude relative to a zero reference level of the negative portion of the range signal is directly proportional to the range of the target source.

References Cited
UNITED STATES PATENTS

| 2,573,840 | 11/1951 | Grass | 343—9 |
| 2,993,121 | 7/1961 | Esher | 250—83 |
| 3,020,397 | 2/1962 | Pierce | 343—12 |
| 3,134,104 | 5/1964 | Murphree | 343—112 |

RODNEY D. BENNETT, JR., Primary Examiner

DANIEL C. KAUFMAN, Assistant Examiner

U.S. Cl. X.R.

250—83.3; 343—112

UNITED STATES PATENT OFFICE
CERTIFICATE OF CORRECTION

Patent No. 3,476,921                                          November 4, 1969

Sheldon Jones et al.

It is certified that error appears in the above identified patent and that said Letters Patent are hereby corrected as shown below:

Column 1, line 26, "dtetcting" should read -- detecting -- line 34, "altiudes" should read -- altitudes --; line 71, "tatnce" should read -- tance --. Column 3, line 35, "-" shou read -- (-) --. Column 5, line 45, "magneic" should read -- magnetic --. Column 7, line 9, "reuslts" should read -- result line 14, "Ths" should read -- This --. Column 9, line 34, "66" should read -- 66a --. Column 10, line 1, "potentniometer" sho read -- potentiometer --; line 11, after "clutch" insert -- 54 now energized through the clutch --. Column 11, line 65, "radiaiton" should read -- radiation --. Column 12, line 60, "collison" should read -- collision --. Column 14, line 67, af "distance" insert -- to the source of radiation --. Column 15, line 17, "deteited" should read -- detected --.

Signed and sealed this 12th day of May 1970.

(SEAL)
Attest:

EDWARD M. FLETCHER, JR.                            WILLIAM E. SCHUYLER
Attesting Officer                                        Commissioner of Pat